United States Patent [19]

Ryken et al.

[11] Patent Number: 5,203,150

[45] Date of Patent: Apr. 20, 1993

[54] HINGED SHIELD FOR CROP CUTTING APPARATUS

[75] Inventors: Jim D. Ryken, New Sharon; Louis J. Norton, Pella, both of Iowa

[73] Assignee: Vermeer Manufacturing Company, Pella, Iowa

[21] Appl. No.: 817,131

[22] Filed: Jan. 6, 1992

[51] Int. Cl.⁵ .................... A01D 34/66; A01D 34/82
[52] U.S. Cl. ...................... 56/16.3; 56/13.5; 56/15.9; 56/255; 56/320.1; 56/DIG. 24
[58] Field of Search .................. 56/1, 6, 15.2, 15.8, 56/15.9, 16.3, 255, 295, 320.1, DIG. 1, DIG. 24, 13.5

[56] References Cited

U.S. PATENT DOCUMENTS

| | | | |
|---|---|---|---|
| 3,469,378 | 9/1969 | Heesters et al. | 56/320.1 X |
| 3,783,533 | 1/1974 | Konig et al. | 56/6 |
| 3,974,630 | 8/1976 | van der Lely | 56/295 |
| 4,183,196 | 1/1980 | Oosterling et al. | 56/6 X |
| 4,385,484 | 5/1983 | Ehrhart et al. | 56/320.1 |
| 4,739,609 | 4/1988 | Meier et al. | 56/DIG.1 X |

Primary Examiner—George A. Suchfield
Attorney, Agent, or Firm—Kent A. Herink; Brian J. Laurenzo

[57] ABSTRACT

A hinged safety shield for a crop cutting apparatus having a frame for attachment to a tractor. A transversely extended cutter bar is supported on the frame for pivotal movement between a lower, operating position and a raised, transport position. The safety shield is pivotally mounted at one end portion thereof to the frame. A hydraulic cylinder for pivotally moving the cutter bar also acts to raise the shield from a lower, shielding position to an upper position. The safety shield is held in the upper position while the cutter bar is lowered whereupon unrestricted access is gained to the cutter bar for repair and maintenance procedures.

12 Claims, 4 Drawing Sheets

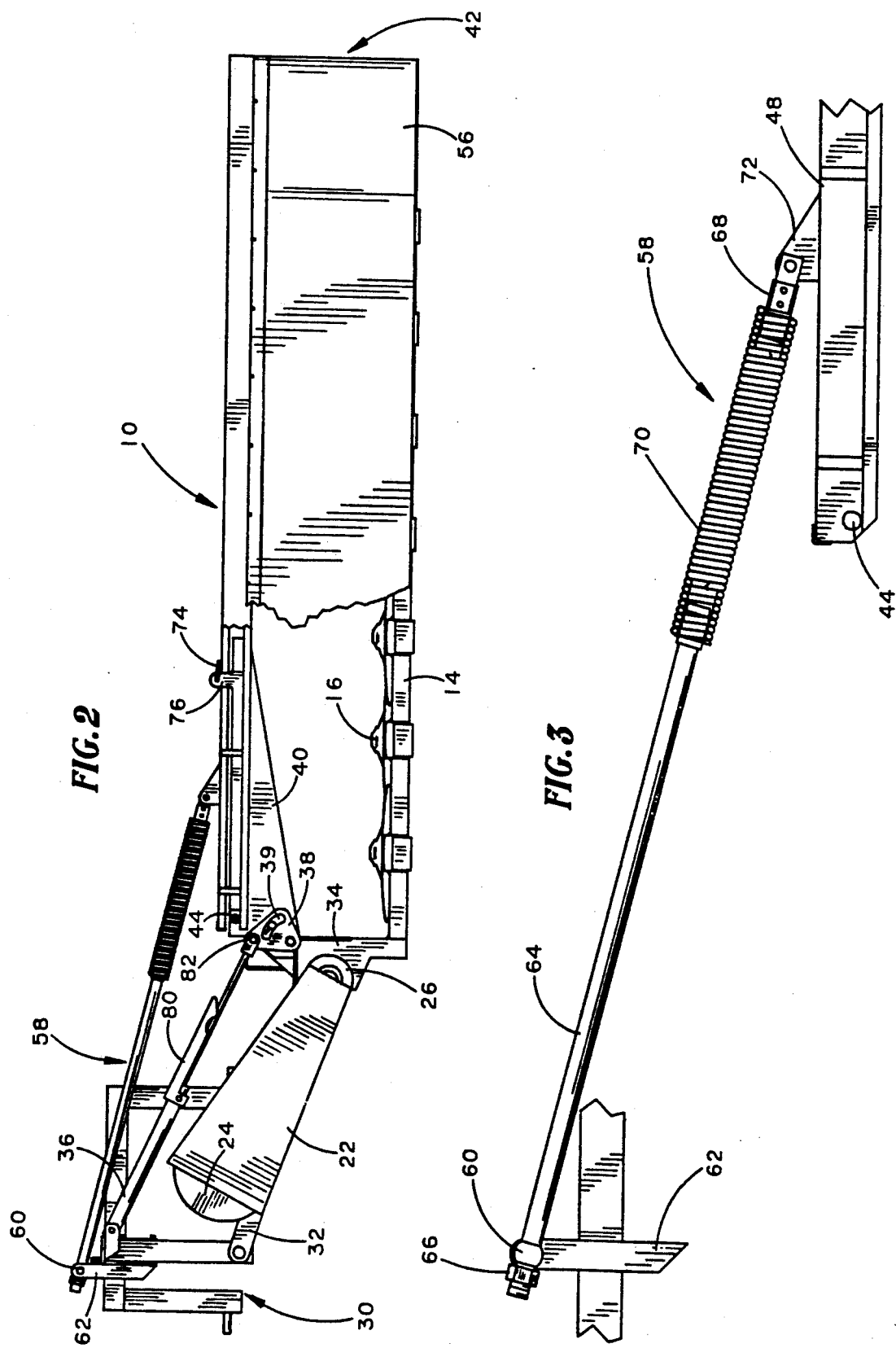

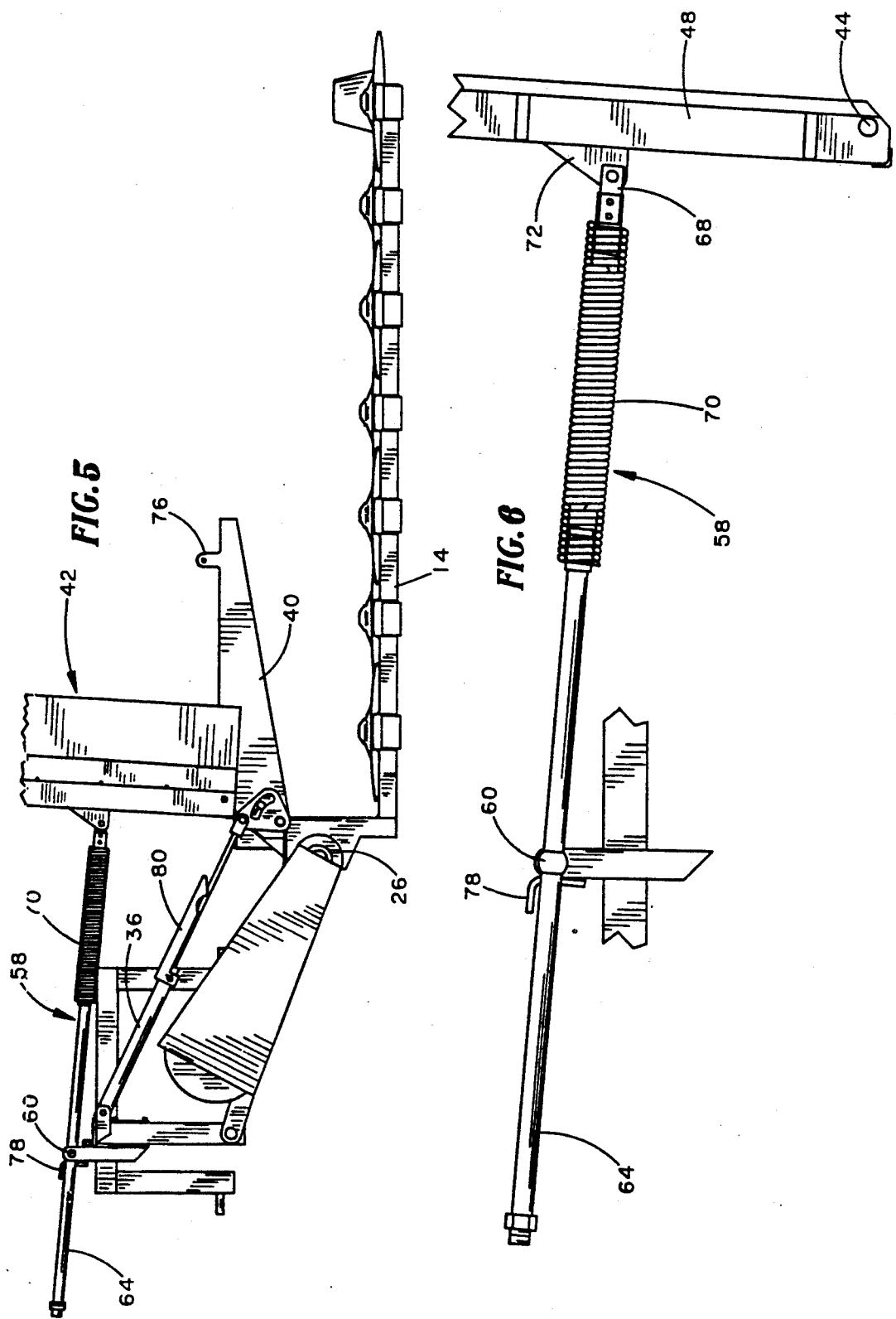

HINGED SHIELD FOR CROP CUTTING APPARATUS

BACKGROUND OF THE INVENTION

The invention relates generally to shields for cutting apparatus and, more specifically, to a hinged shield for the cutter bar of a rotary disc mower which is pivotable to provide full and complete access to the mower cutter bar.

In the raising of forage crops such as alfalfa, bermuda grass, and the like, it is common to use a mower to sever the standing forage crop preparatory to collection, processing, and storage for feeding at a later date. Sickle mowers having a transversely extended reciprocating knife have been used for such purposes for many years. More recently, mowers having transversely extended cutter bars with a plurality of rotary discs have come into common usage. U.S. Pat. Nos. 3,974,630, 4,149,359, and 4,157,004 describe examples of such rotary disc mowers.

The rotary discs of such mowers have radially extended blades and are rotated at a high rate of speed in a horizontal plane. The rotating horizontal discs are efficient at severing crop material. Their structure, motion, and conditions under which they operate, however, require that they be shielded so as to reduce the likelihood that foreign objects which come into contact with the rapidly rotating discs will be expelled from the mower and possibly causing damage or personal injury.

Two general types of shields for such mowers are known. The first is a rigid shield that is secured to the mower and removable by an operator with considerable difficulty and requiring extended time for what amounts to disassembly. The second type of shield is hinged along an axis parallel to the transversely extended cutter bar. When pivoted to a position for cleaning or maintenance of the cutter bar, substantial portions of the cutter bar remain covered such that access to the cutter bar is significantly restricted.

SUMMARY OF THE INVENTION

The invention consists of a hinged safety shield for a mowing apparatus which includes a transversely extended cutter bar. The cutter bar is pivotable by a hydraulic cylinder between a substantially horizontal, operating position and a substantially vertical, transport position. The hinged shield is mounted on the mower to substantially cover the cutter bar during operation thereof. The hinged shield is pivoted upwardly by the hydraulic cylinder together with the raising of the cutter bar. A mechanical stop is used to hold the shield in the upper, pivoted position while the cylinder lowers the cutter bar to the horizontal position whereby it is exposed for free access to perform maintenance or repair. A telescoping spring assembly interconnects the shield and the mower to provide a spring-biased floating action of the cutter bar during use thereof to cut crop materials and to permit lowering of the cutter bar while the shield remains in the upper position therefor.

An object of the invention is to provide a hinged safety shield for the cutting apparatus of a mower, which shield pivots on an axis perpendicular to the cutter bar to provide free access to the cutter bar for maintenance and repair procedures.

Another object of the invention is to provide spring tensioning means for assistance in supporting the weight of the shield and cutter bar during operation and operable to retain the shield in the upper, maintenance and repair position therefor.

A further object of the invention is to provide for the use of an existing cutter bar lift cylinder to raise and lower the cutter bar independently of the hinged safety shield and, when used in conjunction with the spring biasing means, permits the safe and convenient lifting of the shield away from the cutter bar.

These and other objects of the invention will be made obvious to a person of ordinary skill in the art upon review of the specification, figures, and claims.

BRIEF DESCRIPTION OF THE DRAWINGS

FIG. 2 is a rear elevational view of the mower of FIG. 1 with the cutter bar and safety shield in their lower, substantially horizontal positions.

FIG. 3 is an enlarged partial detail view of the telescoping spring assembly corresponding to the position illustrated in FIG. 2.

FIG. 5 is a rear elevational view of the cutter bar in the lower, horizontal position therefor and the hinged safety shield in the upper, maintenance or repair position therefor.

FIG. 6 is an enlarged partial detail view of the telescoping spring assembly corresponding to the position illustrated in FIG. 5.

DETAILED DESCRIPTION OF A PREFERRED EMBODIMENT

Figure 1:
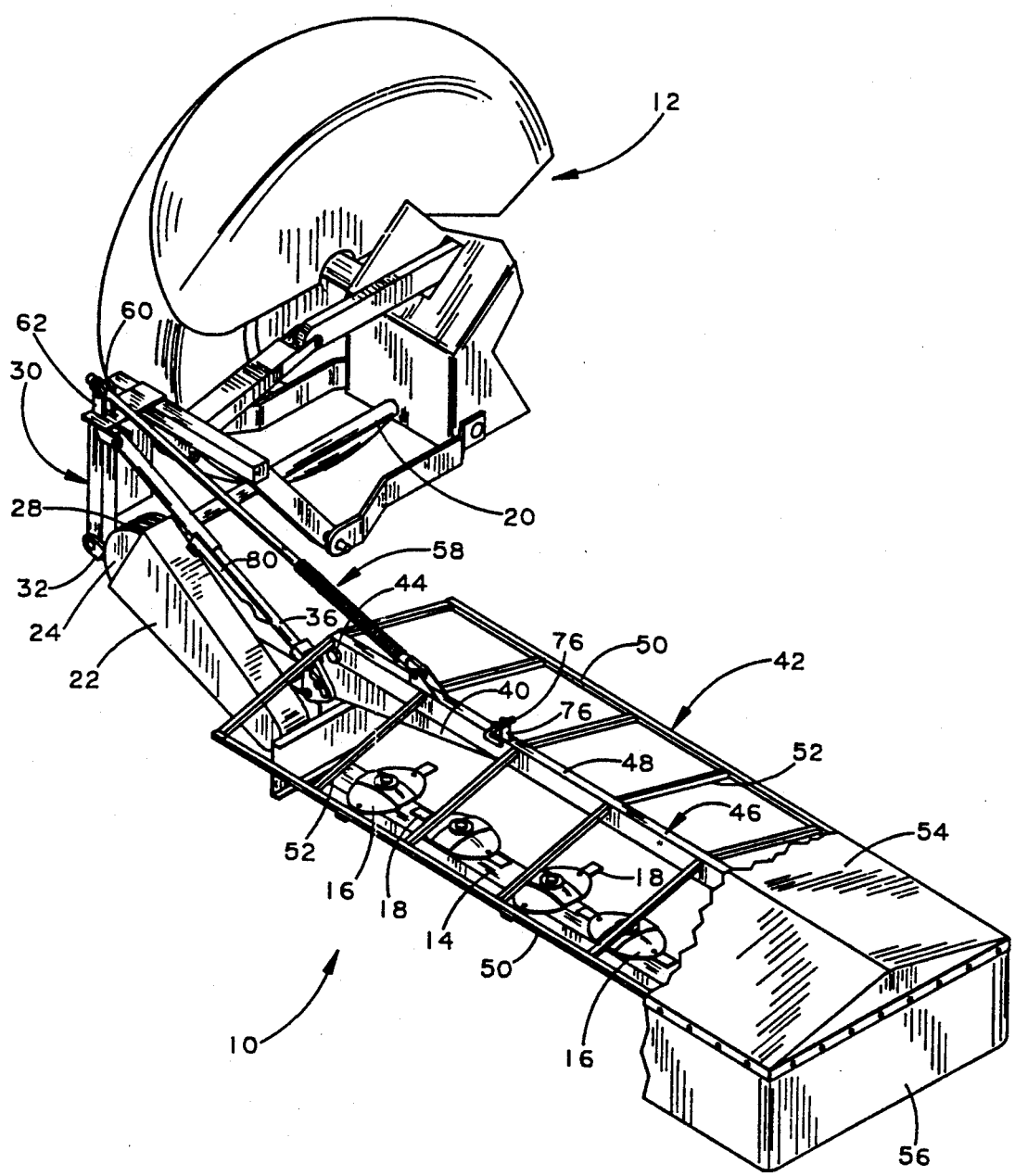
FIG. 1 is an upper rear perspective view of a tractor-mounted rotary disc mower to which the safety shield of the present invention has been attached with portions of the shield covering removed to show the cutting discs of the cutter bar.

Illustrated in FIG. 1, generally at 10, is a crop mowing apparatus shown mounted to a tractor 12. The crop cutting apparatus 10, in the preferred embodiment, includes a transversely extended cutter bar 14 which has a plurality of rotary cutter discs 16 mounted at spaced intervals along its length. Each rotary cutter disc 16 includes a pair of radially extended and diametrically opposed knives 18. In use, the rotary cutter discs 16 are rotated at a high rate of speed in a substantially horizontal plane parallel to the ground. As the tractor 12 transports the crop cutting apparatus 10 over the ground, the knives 18 sever the crop material. Crop cutting apparatus having a rotary disc cutter bar are described in U.S. Pat. Nos. 3,974,630, 4,149,359, and 4,157,004, which are incorporated herein by this reference.

The cutter bar 14 is operably connected to the power take off of the tractor 12 through a power take off shaft 20 and a belt drive assembly 22 which includes an input sheave 24 and an output sheave 26 (FIGS. 2, 4, and 5) which are drivably connected to each other by a plurality of V-belts 28. Pivotable movement of portions of the crop cutting apparatus 10, accordingly, can take place at the axes of rotation of both the input sheave 24 and the output sheave 26.

A main frame, indicated generally at 30, of the crop cutting apparatus 10 is mounted to the three point hitch of the tractor 12. The cutter bar 14 is interconnected for pivotal movement about the rotational axis of the output sheave 26 which is parallel to the direction of motion of the tractor 12. The main frame 30 includes structural link 32 that extends transversely to support the output sheave 26 and cutter bar gear box assembly 34 (FIG. 2) that extends perpendicularly from the proximal end portion of the cutter bar 14. The output sheave 26 is received for rotation in the gear box assembly 34 for drivable connection to the cutter bar 14. The structural link 32 thus acts to support gear box assembly 34 and the cutter bar 14 on the main frame 30.

A linear actuator which in the preferred embodiment is a hydraulic cylinder 36 is pivotally attached at a first end portion thereof to a high point of the main frame 30. It extends transversely to where it is pivotally attached at the opposite end portion thereof to the cutter bar gear box assembly 34 through an adjustable pivot plate 38. Extension and retraction of the hydraulic cylinder 36 will pivot the cutter bar 14 about the rotational axis of the output sheave 26.

A shield support arm 40 extends parallel to and above the cutter bar 14 from an upper portion of the cutter bar frame section 34. A safety shield 42 is attached to the shield support arm 40 for pivotal motion relative thereto about a pin 44. The shield support 40 defines the minimum separation distance of the shield 42 and the cutter bar 14 by resting contact engagement thereon of the shield 42.

The shield includes a rigid, substantially rectangular frame 46 having a central spine member 48 and a pair of side frame members 50, one each of which is laterally spaced to either side of the spine member 48 and interconnected thereto by a plurality of spaced rib members 52. The top of the shield 42 is a metal cover 54 which encloses the upwardly exposed portions of the shield frame 46. A rubber curtain 56 depends from the outer periphery of the shield frame 46 and is of a height substantially equal to the distance of the frame 46 above the ground during operation of the crop cutting apparatus 10. Accordingly, when in the position illustrated in FIGS. 1 and 2, the safety shield 42 will cover the cutter bar 14 and act to reduce the likelihood of objects which may come into contact with the rotating discs 16 and associated knives 18 from being forcefully expelled outside the confines of the shield 42.

The safety shield 42 is linked to the main frame 30 by a telescoping spring assembly, indicated generally at 58. The telescoping spring assembly 58 is mounted for sliding and pivotal movement relative to the main frame 30 by way of a pivot tube 60 which is supported above the main frame 30 by a pair of support ears 62. The spring assembly 58 includes a first rod section 64 that is received for sliding movement inside a transverse throughbore of the pivot tube 60. A nut 66 is threaded on the end portion of the first rod section 64 that extends outside of the pivot tube 60 and serves as a stop to prevent the unintended withdrawal of the first rod section 64 from the pivot tube 60.

The telescoping spring assembly 58 also includes a second rod section 68 which is interconnected to the first rod section 64 by a spring 70. The second rod section 68 is pivotally attached to a pair of attachment ears 72 which are secured to the spine member 48 of the shield frame 46. The interconnection of the rod sections 64 and 68 to the spring 70 traps the rod section 64 and 68 from withdrawal from the spring 70 but permit substantially longitudinal coaxial movement of the first rod section 64 toward and away from the second rod section 68 within the confines of the spring 70 as the same may be extended by forces acting to separate the two rod sections 64 and 68.

When the crop cutting apparatus 10 is being used to mow a forage crop, the hydraulic cylinder 36 is fully extended to place the cutter bar 14 in a substantially horizontal position. The precise angular position of the cutter bar 14 is allowed to vary within the confines of a radial slot in the adjustable pivot plate 38. The safety shield 42 as described above is supported on the shield support arm 40 and may also be releasably secured thereto by a pin 74 which extends between a pair of ear members 76 (FIGS. 1, 2, and 4) on either side of the spine member 48. In the mowing position, the telescoping spring assembly 58 has been fully extended (FIGS. 1-3) such that a spring-biased floating action is provided to the shield 42 and cutter bar 14.

Figure 4:
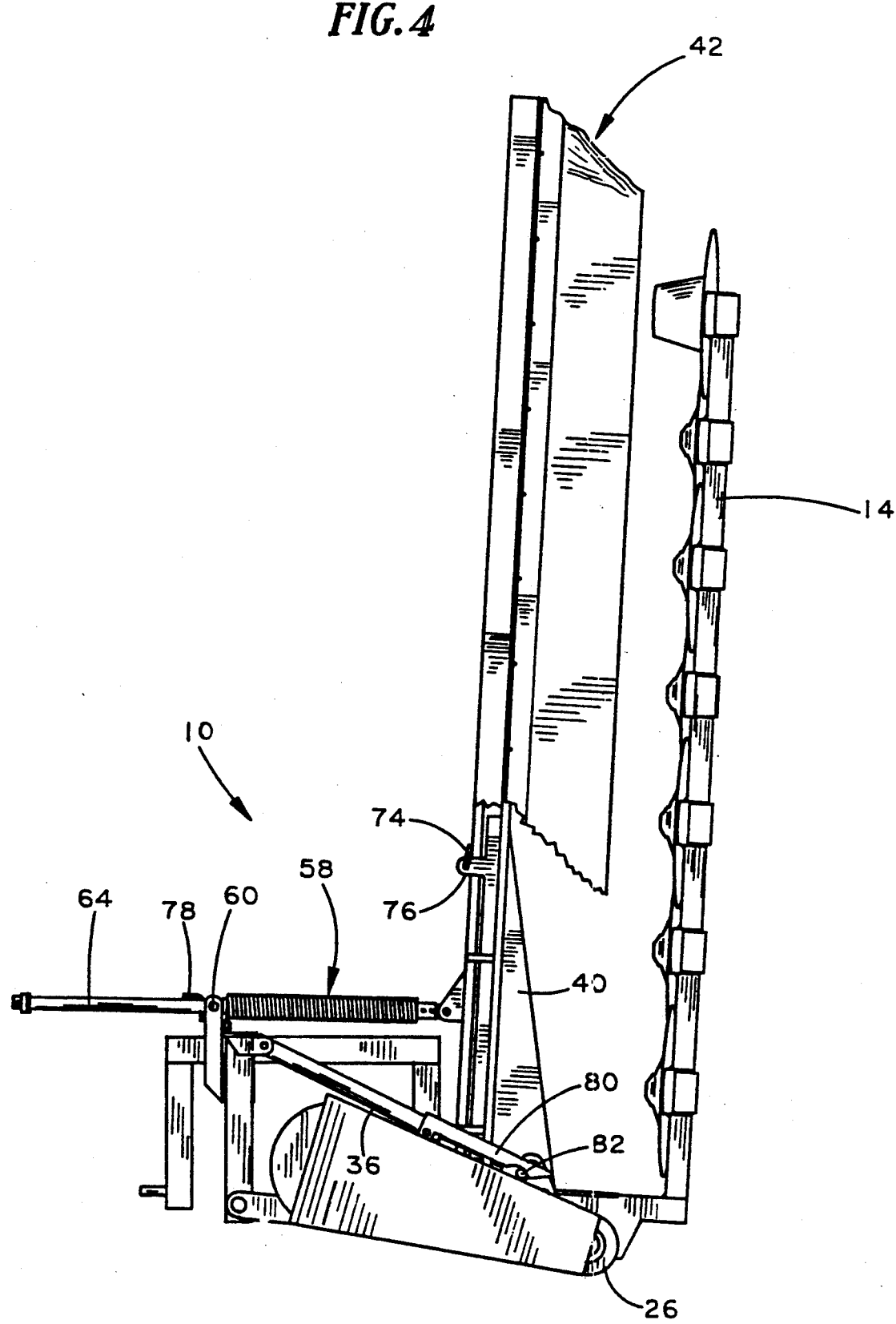
FIG. 4 is a rear elevational view of the cutter bar and hinged safety shield in the upper, vertical or transport position therefor.

To raise the cutter bar 14 to the vertical, transport position therefor, the hydraulic cylinder 36 is retracted (FIG. 4). The shield 42, being supported on the shield support arm 40, is carried therewith to an upper, also substantially vertical position. Pivotal movement of the shield 42 by retraction of the cylinder 36 will cause the first rod section 64 of the telescoping spring assembly 58 to slide outwardly through the pivot tube 60. The shield 42 and cutter bar 14 may be held in this upper, transport position by releaseable securement of a pivotable latch 80 to a pin 82 that secures the hydraulic cylinder 36 to the gear box assembly 34. The shield 42 and cutter bar 14 will, accordingly, be held in the transport position regardless of whether hydraulic pressure is maintained to the hydraulic cylinder 36 or if leakage in the cylinder 36 would otherwise cause the cylinder to unintentionally extend.

To gain access to the cutter bar 14 for repair or maintenance procedures, the mower 10 (FIG. 4) must be in the upright position. The pin 74 (FIG. 4) is withdrawn from ear members 76 and reinstalled in the first rod section 64 as illustrated by locking pin 78. The hydraulic cylinder 36 is extended to lower the cutter bar 14 to the horizontal position (FIG. 5). The lost motion of the first rod section 64 inside the spring 70 permits the required movement of the shield 42 upon pivotal movement of the cutter bar 14 while retaining it in a substantially vertical position (FIGS. 5 and 6). Because the safety shield 42 is hinged about an axis 44 that is perpendicular to the transversely extended cutter bar 14, free and unrestricted access is made available to the cutter bar for the performance of service procedures.

Although the invention has been described with respect to a preferred embodiment thereof, it is to be also understood that it is not to be so limited since changes and modifications can be made therein which are within the full intended scope of this invention as defined by the appended claims.

I claim:

1. A crop cutting apparatus having a frame for attachment to a tractor, said mower comprising:
    (a) a transversely extended cutter bar pivotal between a lower, operating position and a raised, transport position;
    (b) a safety shield operatively associated with the frame for pivotal movement relative thereto;
    (c) means for pivoting said cutter bar between said lower position and said upper position; and
    (d) means for releasably interconnecting said safety shield and said cutter bar to raise and selectively lower said safety shield with said cutter bar.

2. A mower as defined in claim 1, wherein said safety shield in said lower position substantially covers said cutter bar.

3. A mower as defined in claim 1, further comprising means for releasably holding said safety shield in said raised position while said cutter bar is lowered.

4. A mower as defined in claim 3, wherein said cutter bar in said lower position is exposed along substantially its entire length when said safety shield is in said upper position.

5. A mower as defined in claim 1, wherein said interconnecting means includes a shield support arm mounted for movement with said cutter bar.

6. A mower as defined in claim 5, wherein said shield is supported on said shield support arm when said cutter bar and said safety shield are in said lower positions.

7. A mower as defined in claim 5, wherein said shield is supported on said shield support arm as said cutter bar raises said shield from said lower position to said upper position.

8. A mower as defined in claim 1, further comprising spring-biasing means for linking the frame to said safety shield at a point remote from said pivotable mounting site.

9. A mower as defined in claim 8, wherein said spring-biasing means floatingly supports said safety shield and said cutter bar for a range of movement about said lower position.

10. A mower as defined in claim 8, wherein said spring-biasing means includes means for releasably holding said safety shield in said raised position while said cutter bar is lowered.

11. A mower as defined in claim 8, wherein said spring-biasing means includes a first element connected to said frame and a second element connected to said safety shield, said first and second elements being interconnected in a lost-motion connection which permits lowering of said cutter bar from said upper position while said safety shield is held in said upper position.

12. A mower having a frame for attachment to a tractor said mower comprising:
 (a) a transversely extended cutter bar mounted at one end thereof to said frame for pivotal movement between a lower, operating position and an upper, transport position;
 (b) a transversely extended safety shield operatively associated with said frame for pivotal movement between a lower position and an upper position;
 (c) a linear actuator for pivoting said cutter bar between said upper position and said lower position;
 (d) a shield support arm associated with said cutter bar for supporting said shield as said cutter bar raises said shield from said lower position to said upper position; and
 (e) a spring assembly interconnecting the frame and said safety shield for holding said safety shield in said upper position therefor as said cutter arm is lowered from said upper position to said lower position to provide unrestricted access to the full length of said cutter bar.

* * * * *